(12) United States Patent
Lee

(10) Patent No.: US 8,879,623 B2
(45) Date of Patent: Nov. 4, 2014

(54) PICTURE-LEVEL RATE CONTROL FOR VIDEO ENCODING A SCENE-CHANGE I PICTURE

(75) Inventor: Hung-Ju Lee, Pleasanton, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1000 days.

(21) Appl. No.: 12/553,070

(22) Filed: Sep. 2, 2009

(65) Prior Publication Data

US 2011/0051806 A1    Mar. 3, 2011

(51) Int. Cl.
| | |
|---|---|
| *H04N 7/12* | (2006.01) |
| *H04N 19/124* | (2014.01) |
| *H04N 19/152* | (2014.01) |
| *H04N 19/61* | (2014.01) |
| *H04N 19/159* | (2014.01) |
| *H04N 19/149* | (2014.01) |
| *H04N 19/147* | (2014.01) |

(52) U.S. Cl.
CPC ..... *H04N 19/00181* (2013.01); *H04N 19/0009* (2013.01); *H04N 19/00193* (2013.01); *H04N 19/00781* (2013.01); *H04N 19/00218* (2013.01); *H04N 19/00175* (2013.01)
USPC .................................................. 375/240.03

(58) Field of Classification Search
CPC ............................................... H04N 19/00024
USPC ............. 375/240.01, 240.03, 240.04, 240.24, 375/240.27
IPC ....................................................... H04N 7/12
See application file for complete search history.

(56) References Cited

U.S. PATENT DOCUMENTS

| | | | | |
|---|---|---|---|---|
| 5,231,484 | A  * | 7/1993 | Gonzales et al. | 375/240.04 |
| 5,650,860 | A  * | 7/1997 | Uz | 375/240.24 |
| 5,933,532 | A | 8/1999 | Kanji Mihara | |
| 2005/0180502 | A1 | 8/2005 | Puri | |
| 2008/0049844 | A1* | 2/2008 | Liu et al. | 375/240.27 |
| 2008/0151998 | A1 | 6/2008 | He | |

FOREIGN PATENT DOCUMENTS

| | | |
|---|---|---|
| EP | 1549074 | 6/2005 |
| JP | 10075451 | 3/1998 |
| JP | 2001512643 | 8/2001 |
| JP | 2009177443 | 8/2009 |
| WO | 9837701 | 8/1998 |

OTHER PUBLICATIONS

Japanese Office Action for Japanese Application No. 2010-196686 dated Jul. 12, 2011.
European Search Report for European Application No. 10174307 dated Feb. 4, 2011.

(Continued)

*Primary Examiner* — Young Lee
(74) *Attorney, Agent, or Firm* — Joshua D. Isenberg; JDI Patent

(57) ABSTRACT

Computer-implemented rate control in encoding one or more video pictures is disclosed. A quantization parameter (QP) to be used for encoding a current picture one of the one or more video pictures is determined using rate control data that takes picture type, picture complexity, and a target bitcount into account in determining the QP. The current picture is encoded into a compressed format using the QP to generate an encoded current picture. The rate control data is updated based on statistical data determined from the encoded current picture.

20 Claims, 6 Drawing Sheets

(56) References Cited

OTHER PUBLICATIONS

"Test Model 5 (Test Model Editing Committee)", ITU Study Group 16—Video Coding Experts Group—ISO/IEC MPEG & ITU-T VCEG (ISO/IECJTC1/SC29/WG11 and ITU-T SG16 Q6), XX, XX, No. AVC-491b, Mar. 27, 1993, XP030000486.

Miz Z et al. "Novel real-time rate control algorithm for constant quality H.264/AVC high vision codec", Signal Processing & Its Applications, 2009. CSPA 2009. 5th International Colloquium on, IEEE, Piscataway, NJ, USA, Mar. 6, 2009, pp. 323-326, XP031471210, ISBN: 9781424441518.

Ma, S. et al. "Rate-distortion analysis for H264/AVC video coding" IEEE Transactions on Multimedia, vol. 8, Issue 3, Jun. 2006, pp. 467-477.

Minqiang Jiang; Nam Ling, "Low-delay rate control for real-time H264/AVC video coding" IEEE Transactions on Multimedia, vol. 8, Issue 3, Jun. 2006, pp. 467-477.

Ping Li, X.K. Yang, W.S. Lin, "Buffer-Constrained R-D Model-Based Rate Control for H.264/AVC", Proceedings of IEEE International Conference on Acoustics, Speech, and Signal Processing, 2005 . . . (ICASSP '05). Mar. 18-23, 2005, II, pp. 321-324.

Japanese Office Action for Japanese Application No. 2010-196686 dated Oct. 25, 2011.

* cited by examiner

PICTURE-LEVEL RATE CONTROL FOR VIDEO ENCODING A SCENE-CHANGE I PICTURE

CROSS REFERENCE TO RELATED APPLICATIONS

This application is related to commonly-assigned co-pending U.S. patent application Ser. No. 12/553,069, which is filed the same day as the present application and entitled "SCENE CHANGE DETECTION", the entire contents of which are incorporated herein by reference.

This application is related to commonly-assigned co-pending U.S. patent application Ser. No. 12/553,073, which is filed the same day as the present application and entitled "PARALLEL DIGITAL PICTURE ENCODING", the entire contents of which are incorporated herein by reference.

This application is related to commonly-assigned co-pending U.S. patent application Ser. No. 12/553,075, which is filed the same day as the present application and entitled "UTILIZING THRESHOLDS AND EARLY TERMINATION TO ACHIEVE FAST MOTION ESTIMATION IN A VIDEO ENCODER", the entire contents of which are incorporated herein by reference.

FIELD OF THE INVENTION

Embodiments of the invention are related to video encoding and more particularly to a high quality rate controller for various video coding environments.

BACKGROUND OF THE INVENTION

Digital signal compression is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

MPEG-4 AVC (Advanced Video Coding), also known as H.264, is a video compression standard that offers significantly greater compression than its predecessors. The H.264 standard is expected to offer up to twice the compression of the earlier MPEG-2 standard. The H.264 standard is also expected to offer improvements in perceptual quality. As a result, more and more video content is being delivered in the form of AVC(H.264)-coded streams. Two rival DVD formats, the HD-DVD format and the Blu-Ray Disc format support H.264/AVC High Profile decoding as a mandatory player feature. AVC(H.264) coding is described in detail in "Draft of Version 4 of H.264/AVC (ITU-T Recommendation H.264 and ISO/IEC 14496-10 (MPEG-4 part 10) Advanced Video Coding)" by Gary Sullivan, Thomas Wiegand and Ajay Luthra, Joint Video Team (JVT) of ISO/IEC MPEG & ITU-T VCEG (ISO/IEC JTC1/SC29/WG11 and ITU-T SG16 Q.6), 14th Meeting: Hong Kong, CH 18-21 Jan. 2005, the entire contents of which are incorporated herein by reference for all purposes.

Video signal coding often involve situations in which video is to be encoded at a given bit rate, a give frame rate and a given buffer size.

It is desirable to encode a video signal in a way that avoids underflow or overflow of a client buffer due to mismatching between the source bit rate and the available channel bandwidth available for delivering the resulting compressed bitstream. Rate-control schemes have been developed to address these issues. These rate-control schemes can be classified into two major categories: constant-bit-rate (CBR) control for the constant-channel-bandwidth video transmission and variable-bit-rate (VBR) control for the variable-channel-bandwidth video transmission. These rate-control schemes can be further classified according to the unit of rate-control operation, e.g., macroblock-, slice-, or frame-layer rate control. Rate-control schemes determine how to allocate proper bits to each coding unit according to the buffer status and how to adjust an encoder quantization parameter (QP) to properly encode each unit with the allocated bits.

It is within this context that embodiments of the invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the invention are related to a high quality rate controller for various video coding environments, including multi-processor architecture. Embodiments of the invention provide a more accurate and effective rate distortion model for smoother quantization parameter transition to provide more stable perceptive experience.

According to an embodiment of the invention, given a pre-specified coding condition, a rate controller is able to generate a series of proper quantization parameters, one of which is for each picture frame of a video sequence to meet a target bitrate and a target visual quality. The proposed rate control algorithm aims to be applicable for various coding conditions, ranging from different target bit rates, frame resolutions, buffer restrictions, memory limitation, constant/variable bitrates, processor architectures, etc.

The rate control algorithm described herein has been proposed and developed to control video bitrate and video quality imposed by the requirement of a user's applications. As noted above, a rate controller is an essential component of a complete video coding system. Given a pre-specified coding condition, a rate controller may generate a series of proper quantization parameters, each of which is for a corresponding picture or frame of a video sequence to meet the target bitrate and the target visual quality. The proposed rate control algorithm aims to be applicable for various coding conditions, ranging from different target bit rates, frame resolutions, buffer restrictions, memory limitation, constant/variable bitrates, processor architectures, etc.

Figure 1:
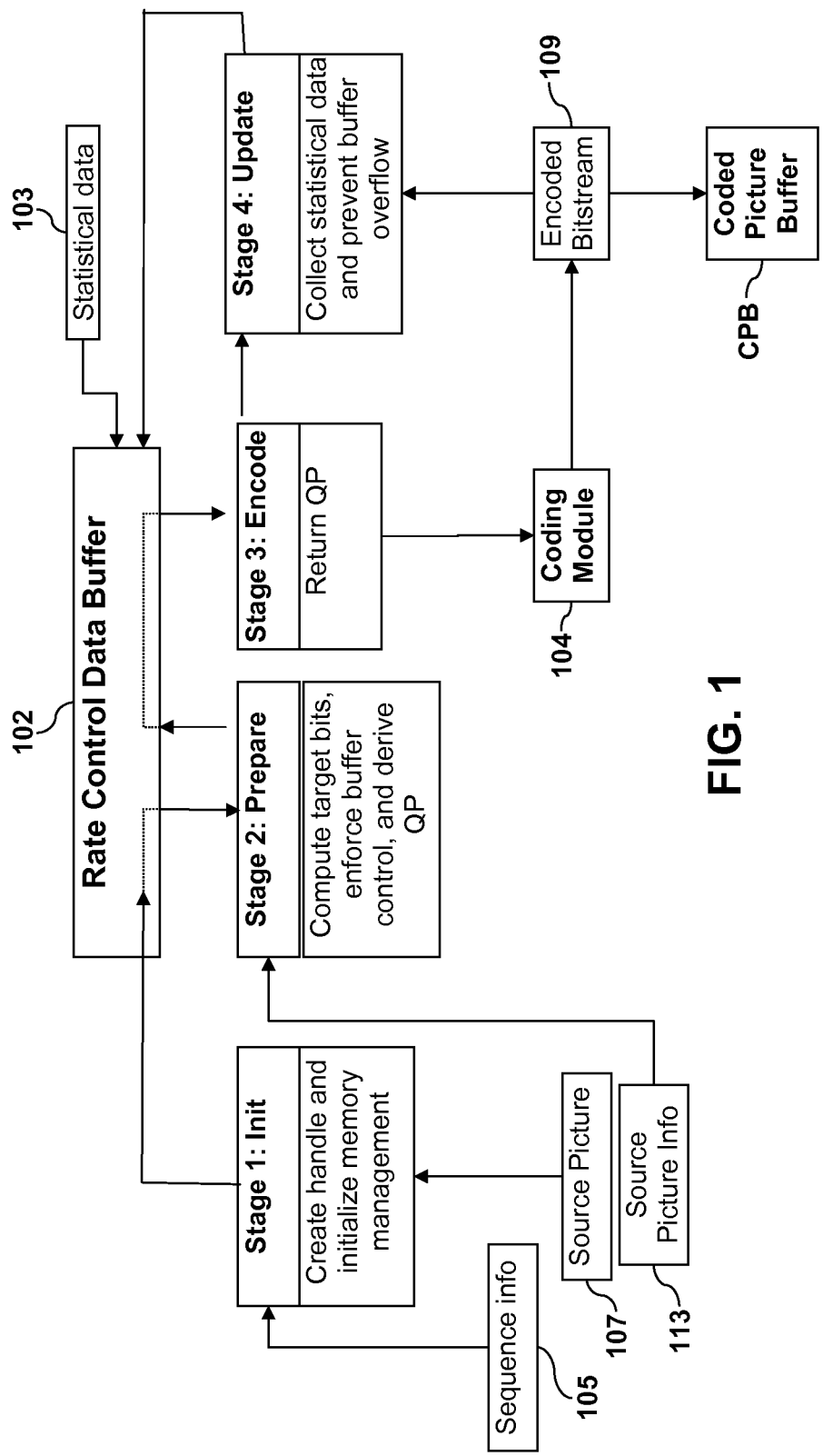
FIG. 1 is a block diagram illustrating the rate control performed in four stages.

The proposed rate control algorithm 100 may be described in terms of four stages, identified as Stage 1, Stage 2, Stage 3 and Stage 4 as shown in FIG. 1. Stage 1 is mainly used to set up an initial status of a rate control data buffer 102. The rate control data buffer 102 is configured to store data that are relevant to the rate control algorithm. Such data may include statistical data 103 such as a number of bits for one or more previously encoded pictures, a complexity determined from sequence information 105 relating to one or more previously encoded pictures and/or the current picture, a quantization parameter estimated, e.g., from one or more previously encoded pictures and other relevant data. The statistical data may also include distortions computed by comparing reconstructions of encoded pictures to the corresponding original pictures. By way of example, distortion may be measured as a sum of squared errors between an original picture and a reconstructed picture. Distortion may also be measured between corresponding sub-units of a picture, such as blocks, macroblocks, slices, etc.

The sequence information 105 may include, e.g., a frame rate and/or a bitrate for a particular group of pictures (GOP). In stage 1, sometimes referred to herein as the initialization stage, a source picture 107 is input to be re-ordered based on a user-specified coding pattern and video detection results. At this stage, parameters may be reset and memory and buffer space may be allocated. During this stage, the source picture 107 to be encoded may be examined for its complexity.

In Stage 2 a picture-level quantization parameter (QP) is derived based on the data collected in the rate control data buffer 102 and source video frame. The picture-level QP may be derived based on the picture type of the source picture 107, a complexity of the source picture 107, an estimated target number of bits and an underlying rate distortion model. Other factors such as picture distortion, buffer fullness, and a QP clipping scheme with a previously coded frame may also be taken into account to determine the final QP for the source picture 107.

In Stage 3 the final QP determined in Stage 2 is sent to one or more main coding modules 104 for encoding of the source picture 107. Each coding module 104 may implement typical picture coding functions, such as intra search and mode decision. Stage 3 may be implemented, e.g., by passing the QP to a calling function that actually encodes the video frame. The resulting encoded picture 109 may be stored in a coded picture buffer CPB. Any suitable coding method may be used in implementing stage 3.

In Stage 4, statistical data is collected and updated in the rate control buffer 102. The encoded bit stream corresponding to the encoded source picture 109 is examined for its size, and the distortion between the pixels for the original source picture 107 and the pixels from its reconstruction from the encoded source picture 109 are calculated and recorded.

Figure 2:
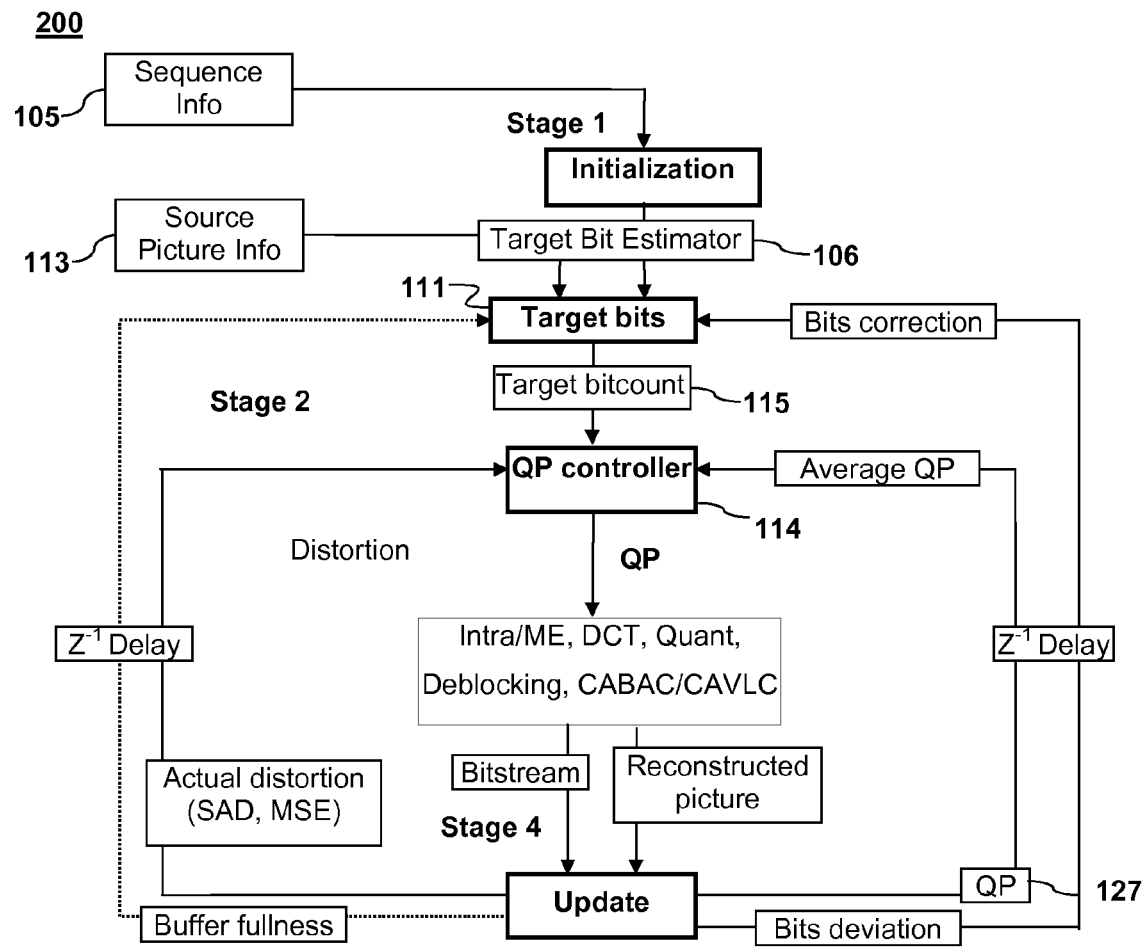
FIG. 2 is a block diagram illustrating the rate control of the present invention.

The statistical data 103 stored in a rate control data buffer and its interaction with the functional blocks of a rate controller 200 is shown in FIG. 2. In the initial stage (Stage 1), sequence-level information 105 may be used to define pre-specified constants and variables. Furthermore, buffer management and connection of the rate controller 200 with other major threads may be established at this stage. In Stage 2, a target bit estimator 106 estimates a target bitcount for the current picture, frame, or field. The estimator uses source picture information 113, e.g., the input source pixels, the input picture type and optional information in ME phase one with the rate control data buffer 102 to estimate a target bitcount 115. Note that in CBR coding condition, a special clipping mechanism may be used to reduce the potential risk of buffer overflow.

As used herein, the expression ME phase one refers to a first phase of motion estimation operation. In certain embodiments, motion may be implemented two phases, the first of which is sometimes known as ME phase one. Typically ME phase one obtains somewhat less accurate, but nonetheless adequate motion information at a relatively low computation cost. This information is very up-to-date (e.g., current picture information) used for assisting target bits allocation.

Figure 3:
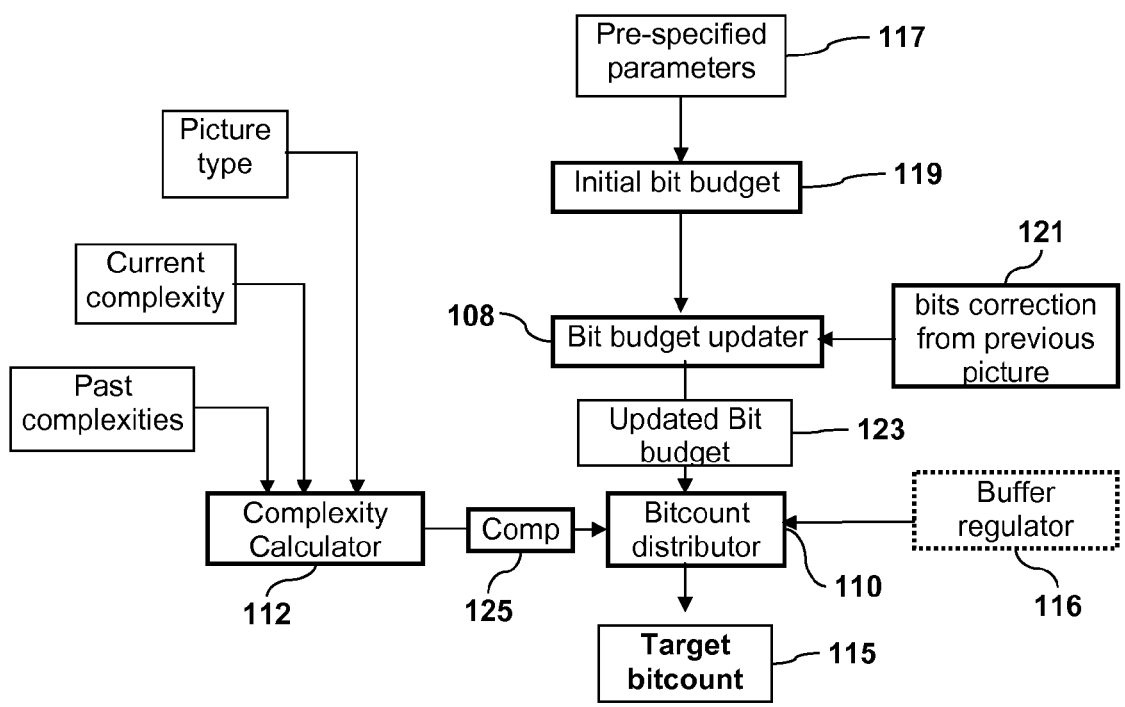
FIG. 3 is a block diagram of Target Bits Estimator in the stage 2 of the rate control.

Two key components of the rate controller 200 are the target bits estimator 106 and QP controller 114. Both of these components may be used to implement second stage 2 as shown in FIG. 2. The details of operation of the target bits estimator 106 are illustrated in FIG. 3. Pre-specified parameters 117 are used to compute an initial bit budget 119. Examples of pre-specified parameters include, e.g., determination of the size of the sliding windows in unit of Group of Picture (GOP). In one implementation, the bits in one or more GOPs (e.g., 4 GOPs) may set as an initial bit budget. If GOP is set in every one second, and the target bit rate is 1 Mbps (1 Million bits per second), then the initial bit budget is 4,000,000 bits in the sliding window. A bit budget updater 108 updates the initial bit budget 119 based on the number of bits 121 corrected from the one or more previous pictures. The resulting updated bit budget 123 provides an input to a bit-count distributor 110.

The bit budget updater 108 may employ a sliding window based bit budget to smooth out initial jitter (e.g., due to insufficient historic data) and the possible content jitters. For example, to encode a video sequence at 6 Mbits per second and 30 frames per second with one GOP for every second, the size of the sliding window may be set as four GOP lengths. That is, in the sliding window, there are 4×6 Mbits=24 Mbits available for 4×30=120 picture frames to be encoded. The size of the selected sliding window may be determined by a compromise between the bitrate accuracy and the smooth video quality. Generally speaking, a smaller window size will have a tighter bit rate controller, which may have a better bitrate convergence, but the consequence is a larger QP fluctuation, resulting in unstable video quality. A larger window size tends to have more stable quality since the rate controller has more flexibility of bit budget to adjust the target bit count 115 based on a longer-term projection. However, the drawback of a larger widow is its convergence speed, resulting in less accuracy of meeting the target bitrate. Two extreme cases are a sliding window with one frame size (e.g., 1/30 sec in the above example) and a sliding window with the total number of picture frames to be encoded.

The next task for the target bits estimator 106 is to determine how to allocate the target bit count 115 to the current picture frame 107. The easiest way in the above example is to equally distribute 24 Mbits among these 120 frames. However, this method may suffer from an inefficient distribution due to ignorance of the coding characteristics of different coding picture types (e.g., Intra picture (I-picture), Predictive picture (P-picture), and Bi-predictive picture (B-picture)), and content variations among the different pictures in the 120 frames.

In embodiments of the present invention, different picture coding types are taken into account in deriving the target bit count. In particular, the target bits estimator 106 may include a complexity calculator 112 that computes a complexity value 125 for the current picture 107. The complexity calculator may calculate a complexity for the current picture 107 based on a current picture type, a current complexity and one or more past complexities for previously encoded frames. Additionally, the complexity calculator 112 may also take into account the content complexity, actual bit usage, and actual distortion. By way of example, and not by way of limitation, three different cases to determine the target bit count for a picture frame are discussed below.

There are many ways to represent a picture complexity. A simple variance is but one example, among others of a representation of picture complexity. A sophisticated representation may alternatively be desired. By way of example and not by way of limitation, an average variance of a macroblock in a picture may be used.

In case 1, the current picture 107 is a picture with a scene change. In case 2, the current picture 107 is a regular I picture, and in case 3, the current picture is a regular P picture.

According to one particular implementation, if the current picture 107 is a B picture, the rate controller may simply assigns a QP (from its associated reference frame) plus some constant K. The constant K may be determined solely or partially by an up-to-date Coded Picture Buffer (CPB) fullness. This way of handling B-pictures allows an encoder more parallel execution capability. That is, any B-picture coding can be executed in parallel within any two corresponding reference frames.

In the discussion that follows, $N_i$ is the number of I pictures in a sliding window, $N_p$ is the number of P pictures in the window, and $N_b$ is the number of B pictures in the window. $R_i$, $R_p$ and $R_b$ are the actual bit usages for pictures of type I, P and B, respectively. In addition, $r_i$, $r_p$ and $r_b$ are estimated bit counts for pictures of picture type I, P and B, respectively. $D_i$, $D_p$, and $D_b$ denote the distortion and $M_i$, $M_p$, and $M_b$ denote the complexity for I, P, and B pictures respectively. The following prophetic example is a sample scenario of series of actual bits usage in encoding a video sequence from time t to t+6. The sequence of picture types leading up to the current picture is as follows: I, P, B, B, P, B, B, k, where k denotes the current picture 107, which may be, e.g., a picture with scene change (in case 1), or a regular I picture (in case 2), or a regular P picture (in case 3).

Rate: $R_i(t)$, $R_p(t+1)$, $R_b(t+2)$, $R_b(t+3)$, $R_p(t+4)$, $R_b(t+5)$, $R_b(t+6)$, $r_k(t+7)$.

Complexity: $M_i(t)$, $M_p(t+1)$, $M_b(t+2)$, $M_b(t+3)$, $M_p(t+4)$, $M_b(t+5)$, $M_b(t+6)$, $M_k(t+7)$.

Distortion: $D_i(t)$, $D_p(t+1)$, $D_b(t+2)$, $D_b(t+3)$, $D_p(t+4)$, $D_b(t+5)$, $D_b(t+6)$.

The bit budget in a sliding window that starts at time t is denoted WB. The window includes all frames from time t up to the picture before the current picture 107. For the sake of generality, the estimated bit usage and complexity for the current picture are denoted $r_k$ and $M_k$ respectively below.

Consider a case where the bit count distributor 110 is trying to estimate a target bit count $r_k$ for the current picture 107. It is noted that, in general, the window may have any suitable number of pictures which may be of arbitrary type.

In case 1, where the current picture 107 is a picture with a scene change, the target bit count 115 for the current picture (i.e., $r_k(t+7)$) may be calculated as:

$$r_k(t+7) = WB(t+6) * AR_i / (N_i * AR_i / AM_i + N_p * AR_p / AM_p + N_b * AR_b / AM_b),$$

where:

$AR_k$ is an average actual bit count over all k pictures back to the most recent scene change I picture, exclusively, and;

$AM_k$ is an average complexity over all k pictures back to the most recent scene change I picture, exclusively, where k is the picture type for the current picture, e.g., either I, P or B picture type.

In case 2, where the current picture 107 is a regular I picture, the goal is to provide a smooth transition from the most recent P-picture. In such a case, the target bit count may be derived by calculating a ratio of the distortion, actual bit usage and picture complexity between the latest I-picture and the latest P-picture. In the picture type sequence in the above example the most recent P-picture before the current picture is the P-picture and t+4. If the current picture 107 is a regular I-picture, it may be assumed that the current I-picture is similar to the most recent I-picture in terms of content characteristics. Consequently, only a minor fine-tuning of the bit rate is needed. Otherwise a scene change I-picture for the current frame is recorded. Assuming the current picture 107 is a regular I-picture, and not a scene-change I-picture, target bit count 115 for the current picture (i.e., $r_k(t+7)$) may be calculated as:

$$r_k(t+7) = [R_i(t)/R_p(t+4)] * [D_i(t)/D_p(t+4)] * [M_i(t)/M_p(t+4)] * R_p(t+4).$$

In case 3, where the current picture 107 is a regular P picture, statistical data from the most recent I, P and B pictures may be used to calculate the target bit count 115. For example, given the above-described picture sequence, the estimated bit count $r_k$ may be computed as follows:

$$r_k(t+7) = WB(t+6) * [R_p(t+4)/M_p(t+4)] / [N_i * R_i(t)/M_i(t) + N_i * R_p(t+4)/M_p(t+4) + N_b * R_b(t+6)/M_b(t+6))].$$

The above target bit count calculation solely depends on picture characteristics and does not consider the situation in which the coded picture buffer CPB has a finite size, which may be denoted $CPB_{size}$. For a real application, the bitcount distributor 108 may adjust the final target bit count 115 according to CPB status and bitrate accuracy to reduce of the risk of CPB overflow and underflow. To facilitate such adjustment, the target bits estimator 106 may include a buffer regulator 116 that provides relevant CPB status information to the bit count distributor 108 for adjustment of the target bit count 115.

There are a number of ways to take the CPB status information into account in adjusting the target bit count 115. For example, in a constant bitrate (CBR) application the target bit count 115 may be adjusted differently depending on whether the buffer is approaching overflow or underflow. In determining whether a potential overflow or underflow situation is present it is useful to define a quantity referred to herein as the coded picture buffer fullness $CPB_{full}$, which may be regarded as a ratio of the quantity of data currently stored in the CPB ($CPB_{curr}$) relative to the finite size $CPB_{size}$ of the coded picture buffer CPB, e.g., $$CPB_{full} = CPB_{curr} / CPB_{size}$$

For example, a potential CPB overflow may exist when $CPB_{full}$ is increasing and is above a pre-defined upper threshold $CPB_{max}$. In such a case, the target bit count 115 (i.e., $r_k(t+7)$) may be adjusted as follows to reduce the risk of CPB overflow:

$$r_k(t+7)=r_k(t+7)*(1.0+C*(CPB_{full}-CPB_{T\text{-}MAX})),$$

where C is a constant multiplier (e.g., 2).

Alternatively, the coded picture buffer CPB may be approaching a potential CPB underflow situation if $CPB_{fullness}$ is moving downward and is below a pre-defined lower threshold $CPB_{min}$.

In such a situation, the target bit count 115 (i.e., $r_k$) may adjusted as follows to reduce the risk of CPB underflow:

$$r_k(t+7)=r_k(t+7)*(1.0+C*(CPB_{min}-CPB_{full})),$$

where C is a constant multiplier (e.g., 2), and $0.0<CPB_{min}<CPB_{max}<1.0$.

In a variable bitrate (VBR) application, CPB overflow is more likely due to a long initial delay (i.e., CPB is fed almost fully before starting to encode). Then the target bit count 115 may be adjusted as follows:

if ($CPB_{cushion}$ is less than sec_threshold), $$r_k(t+7)=r_k(t+7)*(1.0+\text{incr}\_\%),$$

where $CPB_{cushion}=(CPB_{size}-CPB\_curr)/$(encoder's target bitrate), and $0.0<\text{incr}\_\%<1.0$.

The term sec_threshold refers to a threshold value for the CPB cushion in units of time (e.g., seconds) By way of example, and not by way of limitation, if $CPB_{cushion}$ is less than 1 second the value of $r_k(t+7)$ is increased according to the above equation.

Figure 4:
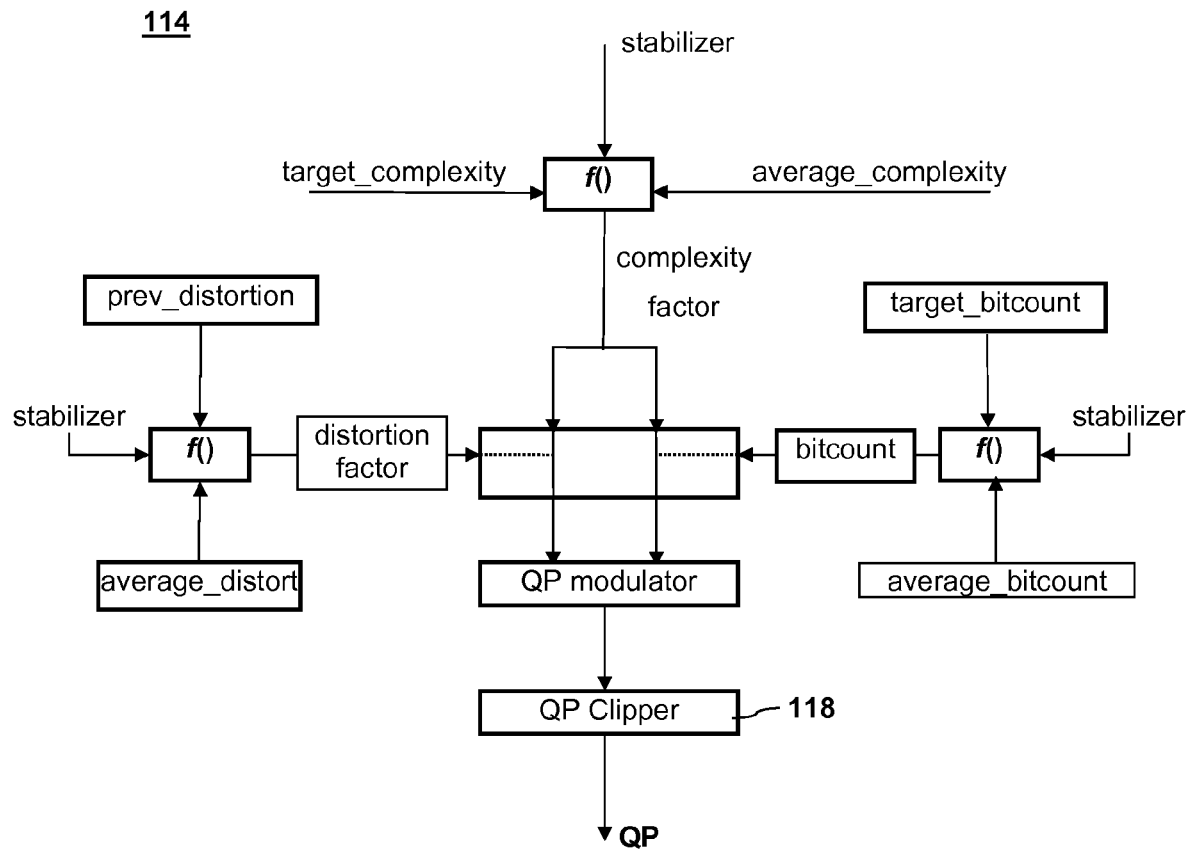
FIG. 4 is a block diagram of the QP controller in the stage 2 of the rate control of the present invention.

Referring again to FIG. 2, the target bits estimator 106 sends the target bitcount to a QP controller 114, which then uses the target bitcount 115 along with distortion and source pixel information in rate control data buffer 102 to derive the QP. By way of example, and not by way of limitation, the QP controller 114 may derive the QP as shown in FIG. 4. Specifically, the QP controller 114 may implement a complexity function that computes a complexity factor based on a target complexity, an average complexity over a window of two or more previous frames, and a complexity stabilizer factor. Furthermore, the QP controller 114 may implement a distortion function that computes a distortion factor based on a distortion for a previous frame, an average distortion taken over a window of two or more previous frames and a distortion stabilizer factor. In addition, the QP controller may implement a function that computes an estimated bitcount based on a target bitcount for the current frame 107, an average bitcount taken over a window of two or more previous frames and a bitcount stabilizer factor.

The QP controller 114 depicted in FIG. 4 may include functional blocks (f( )) that compute the complexity, distortion and bitcount. Each functional block may receive one or more stabilizer factors as inputs. The stabilizers may be used to reduce large fluctuations in complexity, bit count, and distortion. By way of example, and not by way of limitation, stabilizer factors denoted S1, S2 may be used to reduce the effect of fluctuations in average bitcout B and average complexity C in computing estimated bitcount A according to a formula of the type:

$$A=(B+S1)/(C+S2),$$

where S1 and S2 are stabilizers.

To reduce the effect of large fluctuations in average bitcount and average complexity on the calculation A, the rate controller 114 may assign either constant or adaptive values to stabilizer terms S1 and S2, so that the rate controller 114 can obtain a more stable value of the estimated bitcount A than might be obtained by a simple ratio, e.g., B/C. If the values of the stabilizers are chosen properly they tend to stabilize the value of (B+S1)/(C+S2).

Similar stabilizer terms may be used to stabilize similar computations of the complexity factor and distortion factor.

The QP controller 114 may include a QP Modulator that determines a raw QP value based on the bitcount, distortion and complexity factors. The QP controller may further include clipping mechanism 118 that restricts the range of the resulting QP value.

Unlike traditional approaches based purely on an assumed rate distortion model, the proposed rate controller 200 may derive the QP by considering the interaction of the following major factors: picture type, picture complexity, picture distortion and target bitcount 115. With these factors and their interaction relation, the following approach may be used.

As shown in FIG. 4, the QP controller 114 is to derive the final QP value 127 based on the target bit budget calculated from the Bit Count Distributor 110. As aforementioned, QP controller 114 is one of the key components in the rate controller 200. The QP controller 114 has a direct impact on bit count and visual quality. To achieve the best quality, an iterative approach may be used to minimize distortion by finding the best QP. However, this may be inefficient. In embodiments of the present invention, by contrast, the goal is to achieve reasonably good visual quality in a more efficient manner.

To maintain stable video quality, the QP controller 114 to derive a QP that is initially based on a picture type for the current picture 107. Different picture types have different methods to derive the corresponding QPs. By way of example, and not by way of limitation, five different cases may be considered: (1) the very first IDR picture of the video sequence, (2) a IDR picture with scene change, (3) a regular IDR and I picture, (4) regular P picture, and (5) non-reference B picture.

As used herein an IDR picture (or IDR frame) is a special type of I picture (or I frame). The main difference is that when an encoder assigns an IDR to a picture/frame, it means that all the reference frames' information in the frame buffer are gone. Consequently, those references frames cannot be used in subsequent encoding.

The QP in the case of the first IDR picture in a video sequence may be derived based on the complexity, the coding conditions, and some general assumptions. The basic idea is to find out the relation between I-picture and P-picture, and P-picture and B-picture in terms of coding bits complexity. Consider a case in which there are N pictures in a sliding window, and $N=N_i+N_p+N_b$, where $N_i$, $N_p$, and $N_b$ are the number of I, P, and B pictures respectively in the window. The target bit count 115 (i.e., $r_k$) for the first IDR is calculated as follows:

$$r_k=WB/(N_i+N_p/\text{ratio}_p+N_b/\text{ratio}_b).$$

The values of $\text{ratio}_p$ and $\text{ratio}_b$ may be calculated as follows:

$$\text{ratio}_p=C_p/\text{bits\_per\_macroblock},$$

where $C_p$ is a constant, bits_per_macroblock=target_bit_rate/ (target_frame_rate*frame_width/16*frame_height/16).

$$\text{ratio}_b=\text{picture\_complexity}*\text{ratio}_p.$$

In the above equation the term picture complexity, refers to the complexity for the current picture since, in this example, the current picture is the first picture in a sequence.

After the target bit count 115 ($r_k$) is derived, then a simple first order RD model may be applied to obtain the quantization value (referred to herein as an actual QP). Note that this quantization value may be quite different from the final QP (referred to herein as a syntax QP, which is a syntax element and embedded in a bitstream) since the former QP is really used in a quantizer. To convert an actual QP to a syntax QP, the formula $QP_{syntax}=6.0*\log 10(QP_{actual})/\log 10(2.0)$ may be used. Then the result value of $QP_{syntax}$ may be clipped in a pre-defined range between a minimum value $QP_{min}$ and a maximum value $QP_{max}$ to produce the final QP value 127.

In the case of an IDR picture with scene change, the new QP may be derived based on the statistical data 103 including average complexity, average bit usage and average QP from all of its previous I-pictures up to the previously closest IDR with scene change.

The QP controller 114 first determines an old R/M ratio which may be defined as (average bit usage/average complexity) for the past I frames. The QP controller 114 may then derive a new relative R/M ratio as follows:

$$\text{new } R/M \text{ ratio} = (\text{old } R/M \text{ ratio})/(r_k/M_k),$$

where $r_k$ and $M_k$ refer to the target bit count and complexity for the current frame 107. The old R/M ratio may be determined from $R_{k-1}/M_{k-1}$, where $R_{k-1}$ and $M_{k-1}$ are the actual bit usage and complexity for the frame preceding the current frame 107. Then the new actual QP vale may be determined according to:

$$QP_{actual}=(\text{average } QP_{actual})*(\text{new } R/M \text{ ratio}).$$

The new actual QP value may be converted to a new syntax QP value as discussed above.

It is noted that the new QP value may be very different from the QP value for the immediately preceding frame if the current frame 107 is a scene change frame. To reduce large QP fluctuations, the QP clipping mechanism 118 may calculate a complexity difference from the previous frame. The clipping mechanism 118 may then define a range of QP change to forcefully limit the QP change. By way of example, and not by way of limitation, the following clipping scheme may be used.

First a range $QP_{range}$ is defined according to $$QP_{range}=\text{multiplier}*(\max(M_k,M_{k-1})/\min(M_k,M_{k-1})),$$

where $M_{k-1}$ is the complexity for the frame immediately preceding the current frame.

The multiplier may be a constant value determined empirically. By way of example, and not by way of limitation, a multiplier having a constant value of 2 may be used.

Therefore, the final QP value 127 may be restricted to the range of:

$$[QP_{syntax}-QP_{range}, QP_{syntax}+QP_{range}]$$

In the case that the current picture 107 is a regular IDR and I picture, the QP controller 114 may work directly on the value of $QP_{syntax}$. Since the picture frame is regular frame, implying that no noticeable changes occur in video characteristic. (Otherwise scene change should be recorded), to maintain a relatively steady value of $QP_{syntax}$, a LOG operation on the ratio of actual bit count to complexity may be applied. The following RD formula may be used to derive the value of $QP_{syntax}$ for the current frame 107 (denoted $QP_k$) from the value of $QP_{syntax}$ for the previous frame (which is denoted $QP_{k-1}$).

$$\text{LOG}(\text{bitrate/complexity})*QP_{syntax}=\text{CONSTANT}.$$

Based on the above formula, the final value of $QP_{syntax}$ for the current frame 107 may be computed as follows.

$$QP_k=\text{LOG }[(R_{k-1}/M_{k-1})*(QP_{k-1})]/\text{LOG}(r_k/M_k),$$

where $QP_{k-1}$ is the value of $QP_{syntax}$ for the frame preceding the current frame 107.

If the current frame 107 is a regular P picture, the QP controller 114 may maintain a steady value of $QP_{syntax}$ by logarithmically operating on the value of $QP_{actual}$. The new actual QP value for the current frame (denoted $QP_{actual\_k}$) may be derived as $$QP_{actual\_k}=\text{LOG}(R_{k-1})*(QP_{actual\_k-1})/\text{LOG}(r_k^2*R_{k-1}).$$

The value of $QP_{actual\_k}$ may then be converted into a $QP_{syntax}$ value as described above.

If the current picture 107 is a regular B picture, i.e., a non-reference B picture, no error will be propagated. A constant QP may therefore be obtained by simply adding +2 to the syntax QP of its previous reference frame. This situation also provides an opportunity for parallel encoding since there is, in general, no dependency between any two consecutive B pictures. The lack of data dependency between pictures serves as an entry point for parallelizing the encoding process. B-picture coding within two reference pictures can be performed in parallel.

In the encode stage (Stage 2), the rate control algorithm may simply return the QP to its calling function. In the final stage, right after a video frame/field encoding, the rate control collects the actual bit usage (texture bits and overhead bits might be separated), the actual picture distortion, and actual buffer fullness, and update this information in the rate control data buffer 103.

The process from Stage 2 through Stage 4 may be repeatedly performed in the course of video encoding for a series of video frames. It is noted that in embodiments of the present invention, the rate controller need only consider a target bit count for a reference picture (i.e., I-picture, P-picture or B-picture if it is used as a reference picture in a pyramid coding).

Figure 5:
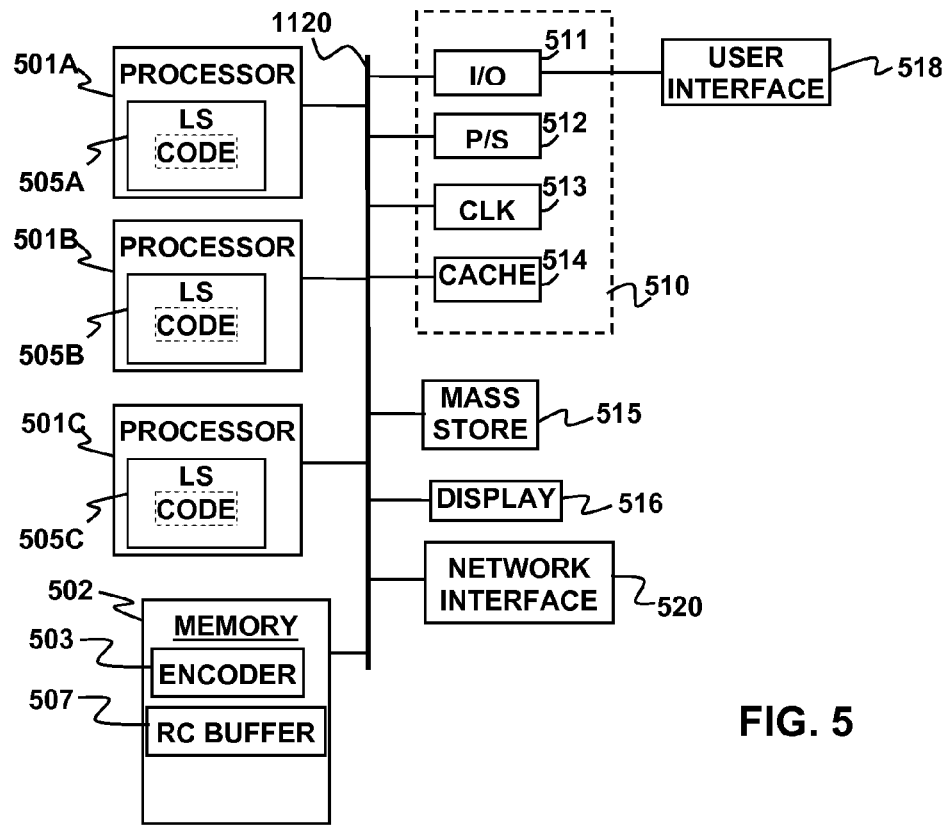
FIG. 5 is a block diagram illustrating an apparatus for implementing video coding using picture level rate control according to an embodiment of the present invention.

FIG. 5 illustrates a block diagram of a computer apparatus 500 that may be used to implement parallel decoding of streaming data on three or more processors as described above. The apparatus 500 generally include a plurality of processor modules 501A, 501B, 501C and a memory 502. As an example of a processing system that uses multiple processor modules, the processor modules 501A, 501B and 501C may be components of a Cell processor.

The memory 502 may be in the form of an integrated circuit, e.g., RAM, DRAM, ROM, and the like). The memory 502 may also be a main memory that is accessible by all of the processor modules 501. In some embodiments, the processors modules 501A, 501B, 501C may have associated local memories 505A, 505B, and 505C. An encoder program 503 may be stored in the main memory 502 in the form of processor readable instructions that can be executed on the processor modules 501. The encoder program 503 may be configured to encode video frame data utilizing the rate control algorithm, e.g., as described above with respect to FIG. 1, FIG. 2, FIG. 3, and FIG. 4. Specifically, the encoder program may compute a QP value in a manner that takes picture type, picture complexity, picture distortion and target bitcount into account in determining the QP value. The program 503 may be written in any suitable processor readable language, e.g., e.g., C, C++, JAVA, Assembly, MATLAB, FORTRAN and a number of other languages. Rate control data 507 may be stored in the memory 502, e.g., in a rate control buffer, as described above. Such rate control data may include statistical data rating to bit utilization, complexity, distortion, QP, etc for a window of previous frames. In some embodiments, during execution of the encoder program 503, portions of program code and/or data 507 may be loaded into the local stores 505A, 505B, and 505C for parallel processing by the processor modules 501A, 501B, 501C.

The apparatus 500 may also include well-known support functions 510, such as input/output (I/O) elements 511, power supplies (P/S) 512, a clock (CLK) 513 and cache 514. The device 500 may optionally include a mass storage device 515 such as a disk drive, CD-ROM drive, tape drive, or the like to store programs and/or data. The device 500 may also optionally include a display unit 516 and user interface unit 518 to facilitate interaction between the apparatus 500 and a user. The display unit 516 may be in the form of a cathode ray tube (CRT) or flat panel screen that displays text, numerals, graphical symbols or images. The user interface 518 may include a keyboard, mouse, joystick, light pen or other device that may be used in conjunction with a graphical user interface (GUI). The apparatus 500 may also include a network interface 520 to enable the device to communicate with other devices over a network, such as the internet. These components may be implemented in hardware, software or firmware or some combination of two or more of these.

There are a number of additional ways to streamline parallel processing with multiple processor in the apparatus 500. For example, it is possible to "unroll" processing loops, e.g., by replicating code on two or more of the processors 501A, 501B, 501C and have each processor implement the code to process a different piece of data. Such an implementation may avoid a latency associated with setting up the loop.

Figure 6:
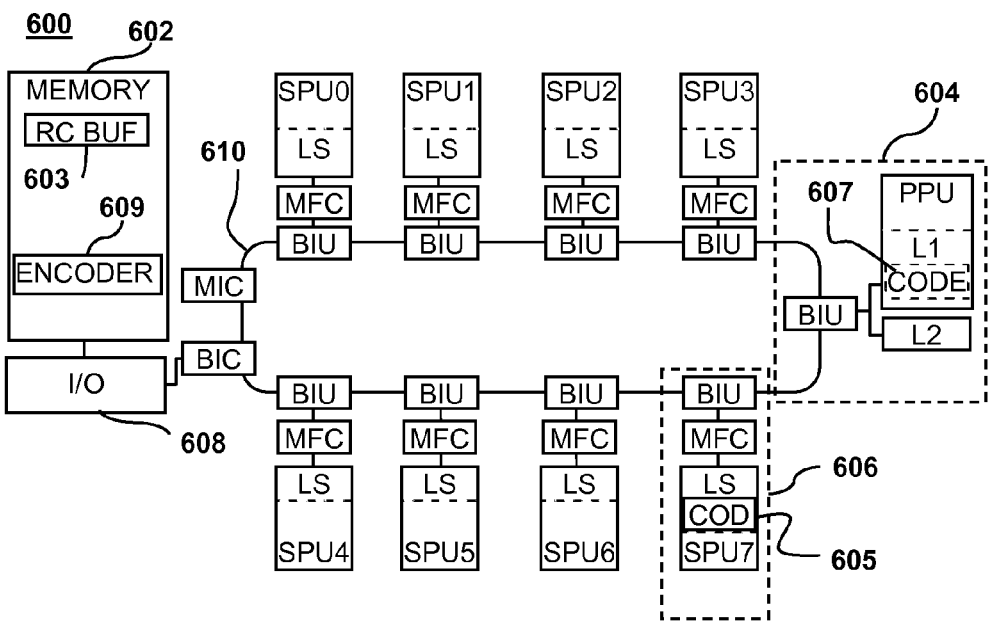
FIG. 6 is a block diagram illustrating an example of an alternative apparatus for implementing video coding using picture level rate control according to an embodiment of the present invention.

As noted above, certain portions of the rate control described above (e.g., the distortion calculation) may be implemented on a multiprocessor system. One example, among others of a multiprocessor system capable of implementing parallel processing is known as a cell processor. There are a number of different processor architectures that may be categorized as cell processors. By way of example, and without limitation, FIG. 6 illustrates a possible configuration of a cell processor 600. The cell processor 600 includes a main memory 602, a single power processor element (PPE) 604 and eight synergistic processor elements (SPE) 606. Alternatively, the cell processor 601 may be configured with any number of SPEs.

By way of example, the cell processor 600 may be characterized by an architecture known as a Cell Broadband engine architecture (CBEA)-compliant processor. In CBEA-compliant architecture, multiple PPEs may be combined into a PPE group and multiple SPEs may be combined into an SPE group. For the purposes of example, the cell processor 600 is depicted as having only a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in Cell Broadband Engine Architecture, which is available online at: http://www-306.ibm.com/chips/techlib/techlib.nsf/techdocs/1AEEE1270EA2776387257060006E61BA/$file/CBEA_01_pub.pdf, which is incorporated herein by reference.

By way of example the PPE 604 may be 64-bit PowerPC Processor Unit (PPU) with associated caches. The PPE 604 may include an optional vector multimedia extension unit. Each SPE 606 includes a synergistic processor unit (SPU) and a local store (LS). In some implementations, the local store may have a capacity of e.g., about 256 kilobytes of memory for code and data. The SPUs are less complex computational units than PPU, in that they typically do not perform any system management functions. The SPUs may have a single instruction, multiple data (SIMD) capability and typically process data and initiate any required data transfers (subject to access properties set up by a PPE) in order to perform their allocated tasks. The SPUs allow the system 600 to implement applications that require a higher computational unit density and can effectively use the provided instruction set. A significant number of SPEs 606 in the system 600, managed by the PPE 604, allows for cost-effective processing over a wide range of applications.

The memory 602, PPE 604, and SPEs 606 may communicate with each other and with an I/O device 608 over a ring-type element interconnect bus 610. The memory 602 may contain rate control data 603 having features in common with the rate control data 507 described above. The memory 602 may also store an encoder program 609 having features in common with the encoder program 503 described above. At least one of the SPE 606 may include in its local store (LS) encoding instructions 605 and/or a portion of the rate control data and/or input video frame data that is to be processed in parallel, e.g., as described below. The PPE 604 may include in its L1 cache, code instructions 607 having features in common with the encoding program 503 described above. Instructions 605 and data 607 may also be stored in memory 602 for access by the SPE and PPE when needed.

The rate control algorithm depicted in FIG. 1 and described further with respect to FIGS. 2-4 may be implemented on an apparatus of the type described with respect to FIG. 5 or FIG. 6 through a series of function calls. For example, the Initialization Stage (Stage 1) may be implemented by calling a function referred to herein as PicRateCtrlInit( ). The PicRateCtrlInit( ) function may be called one time only by an encoder SPU main control thread of the encoder program 507 or 603 in the entire course of encoding. The PicRateCtrl Init( ) function may thus serve as any entry point to the rate control portion of the encoder program. If the rate control instance memory is not enough, the PicRateCtrlInit( ) function may return an error message. The rate control instance memory is the same as the amount of space available in the rate control buffer. The PicRateCtrlInit( ) function may also return an error message if the rate control instance memory is used currently being used by a rate control instance. If no error condition exists, the PicRateCtrlInit( ) function may create rate control handle and allocate memory accordingly based on input parameters. As used herein the term a rate control handle refers to a particular type of pointer commonly used in computer program implementations. A rate control handle is a pointer to a memory address at which a particular rate controller's data may be accessed. In the particular case of an Cell processor implementation, the inputs to PicRateCtrl Init( ) may include (1) an SPU thread configuration buffer, (2) test driver control parameters, (3) stream level configurations, and (4) frame level configurations. The output of the PicRateCtrlInit( ) function is a handle to Picture Rate Control Buffer 102.

The preparation stage (Stage 2 of FIG. 1) may be implemented by calling a function referred to herein as PicRateCtrlPrepare( ). The main task of this function is to derive a QP value based on the input data. The PicRateCtrlPrepare( ) function may be called at the beginning of encoding for each picture, and is the key of the rate control algorithm.

The inputs to PicRateCtrlPrepare( ) may include a rate control handle, a frame level configuration, an input frame buffer, and the rate control data buffer. The PicRateCtrlPrepare( ) function may implement the following operations:
  Checking the buffer fullness in CBR case.
  Adjusting total bitrate budget in sliding window.
  Determining the target bits 111 for the current picture using the Target Bit Estimator 106, e.g., as described above.

If picture type is I/IDR, deriving Picture-I QP using the QP controller 114, e.g., as described above.

If picture type is P, Picture-P QP deriving using the QP controller 114, e.g., as described above.

If picture type is non-ref B, deriving Non-ref-Picture-B QP using the QP controller 114, e.g., as described above.

If picture type is ref B, deriving the ref-Picture-B QP using the QP controller 114, e.g., as described above.

Clipping QP within a pre-specified range (which may be defined in PicRateControlInit( ) to ensure the smooth visual quality transition. This operation may be implemented as described above with respect to the QP Clipping Mechanism 118.

The encoding stage (Stage 3) may be implemented by calling a PicRateCtrlEncode( ) function.

The PicRateCtrlEncode( ) function may be called to obtain the final QP for a given picture. In some embodiments, the PicRateCtrlEncode( ) function may be called to obtain a final QP value for s subsection of a picture (e.g., a slice or macroblock). Thus, embodiments of the invention may be extended to rate control at the macroblock level. PicRateCtrlEncode( ) function may also include call other functions that are conventionally used in encoding a video picture, e.g., functions for Network Abstraction Layer (NAL) coding, Video Coded Layer (VCL) encoding, and de-blocking.

A number of variations are possible on the embodiments described above. For example, in some implementations, the encoding step (Stage 3) may include a distortion calculation that is distributed and processed in parallel on multiple processors. In multi-processor implementations, the total distortion of a picture may be calculated on a section-by-section basis with distortion calculations for different sections of a picture performed in parallel using a different processor for each section. The distortion for each section may be calculated macroblock by macroblock by comparing the original pixels for picture prior to encoding and the reconstructed pixels.

In some implementations, the distortion calculation may be done before de-blocking to speed up the overall performance since there is no need to allocate one more data path from the deblocking thread to the main thread. The discrepancy of the distortion calculation based on the deblocked frame and the undeblocked frame for the rate controller has been determined experimentally to be negligible.

Furthermore, in some implementations, the distortion in each macroblock of a picture section may be carried in the existing MB information container, which may be transferred to the server via DMA. So the NAL coding thread may collect and calculate the overall distortion of the picture. This MB distortion also helps to further improve the picture quality if a macroblock-based rate control is employed.

The update stage (Stage 4) may be implemented by calling a PicRateCtrlUpdate( ) function. The PicRateCtrlUpdate( ) function may be called in two situations: (1) to record the data right after the completion of encoding MB rows at a multicore processor such as a broadband engine (BE); or (2) this is called to collect the statistical data associated with the entire current picture right after the final Video Coded Layer (VCL) bit stream is generated. The inputs to the PicRateCtrl Update( ) function may include, but are not limited to, a rate control handle, raw color space format for the image, a previously reconstructed picture, picture level coding information, and coding bits of the previous picture. The PicRateCtrlUpdate( ) function may internally update the Rate Control Data Buffer 102.

By way of example, and not by way of limitation, the color space format may be 420 YUV. This format includes on luma component (Y) and two chroma components (U and V). Typically, the input to MPEG-based encoders is 420 YUV, meaning that, e.g., from a resolution viewpoint, the dimension of Y is W*H and U and V each have dimensions of W/2*E/2.

By way of example, and not by way of limitation, the PicRateCtrlUpdate( ) function may implement the following operations:

Collecting statistical data.

Updating statistical data in Rate Control Data Buffer 102.

Checking buffer fullness to determine a potential for buffer overflow.

Implement a buffer overflow prevention mechanism if necessary.

Figure 7:
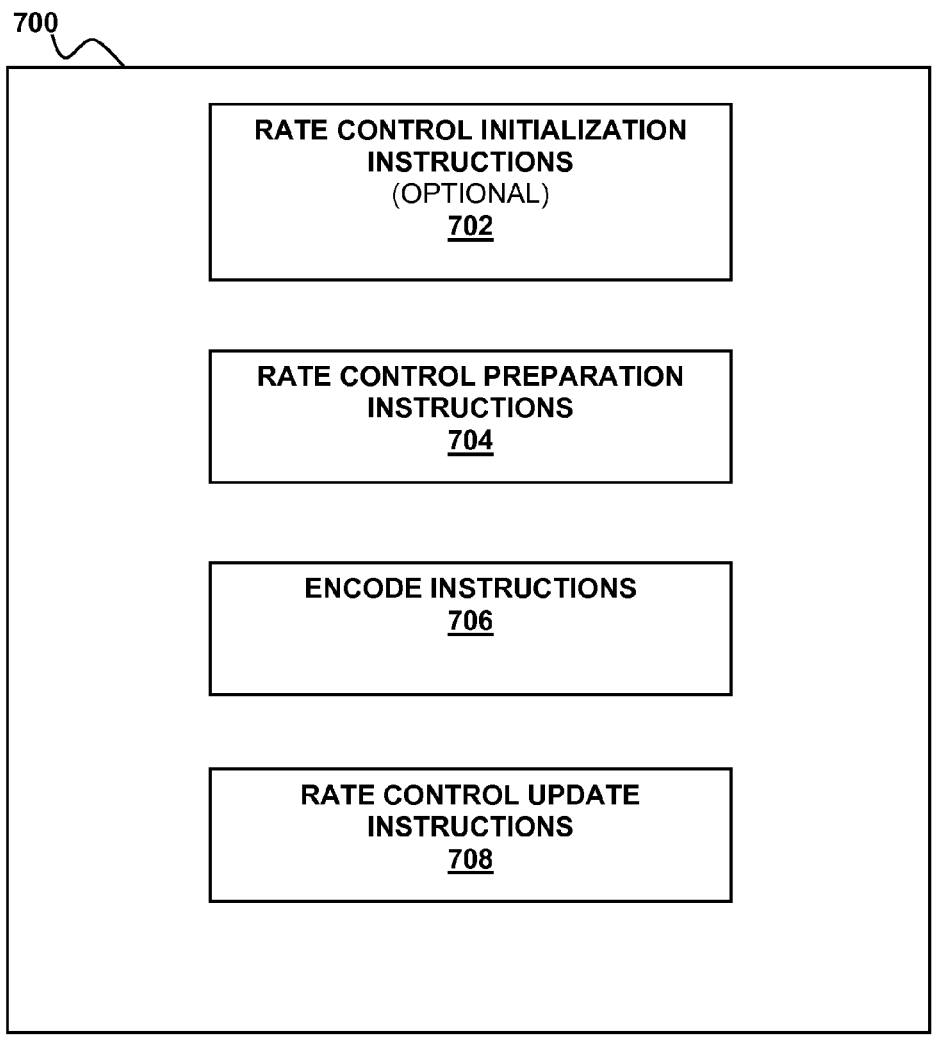
FIG. 7 is a block diagram of a computer readable medium containing computer readable instructions for implementing picture level rate control in accordance with an embodiment of the present invention.

According to another embodiment, instructions for carrying out picture level rate control as described above may be stored in a computer readable storage medium. By way of example, and not by way of limitation, FIG. 7 illustrates an example of a computer-readable storage medium 700. The storage medium contains computer-readable instructions stored in a format that can be retrieved interpreted by a computer processing device. By way of example, and not by way of limitation, the computer-readable storage medium 700 may be a computer-readable memory, such as random access memory (RAM) or read only memory (ROM), a computer readable storage disk for a fixed disk drive (e.g., a hard disk drive), or a removable disk drive. In addition, the computer-readable storage medium 700 may be a flash memory device, a computer-readable tape, a CD-ROM, a DVD-ROM, a Blu-ray, HD-DVD, UMD, or other optical storage medium.

The storage medium 700 optionally contain rate control initialization instructions 702 which may including one or more instructions that implement Stage 1 of the algorithm as described above. By way of example, and not by way of limitation, the initialization instructions may be configured, upon execution, to implement the PicRateCtrlInit( ) function described above.

The storage medium 700 may include one or more rate control preparation instructions 704. The preparation instructions 704 may be configured the Stage 2 of the rate control algorithm described above. By way of example, and not by way of limitation, the initialization instructions may be configured, upon execution, to implement the PicRateCtrlPrepare( ) function described above.

The storage medium 700 may include one or more encode instructions 706. The encode instructions 706 may be configured the Stage 3 of the rate control algorithm described above. By way of example, and not by way of limitation, the initialization instructions may be configured, upon execution, to implement the PicRateCtrlEncode( ) function described above.

The storage medium 700 may include one or more rate control update instructions 708. The preparation instructions 708 may be configured the Stage 4 of the rate control algorithm described above. By way of example, and not by way of limitation, the rate control update instructions may be configured, upon execution, to implement the PicRateCtrlUpdate( ) function described above.

The rate control algorithm described above has been largely implemented in an experimental AVC encoder. The performance of the rate control algorithm demonstrates that the algorithm not only accurately achieves the target bitrate but also control the CPB buffer properly to construct HRD compliant AVC bitstreams. Most importantly, with the effectiveness of the new rate control algorithm to control the quantization parameter, the encoder demonstrates a high fidelity and stable visual quality.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A computer-implemented method for rate control in computer-implemented encoding one or more video pictures, comprising:
    a) determining a quantization parameter (QP) to be used for encoding a current picture one of the one or more video pictures using rate control data, wherein a) includes taking picture type, picture complexity, and a target bitcount into account in determining the QP, wherein, when a current picture is a scene-change I picture, the target bitcount for the current picture is determined from a product of a bit budget times an average actual bitcount divided by a weighted sum of numbers of pictures for given types in a sliding window, wherein the average actual bitcount is an average bitcount for pictures of a same type as the current picture back to a most recent scene change I picture, exclusively, wherein the weighted sum of numbers of pictures includes a term for each of the given types, wherein the term for a corresponding given type includes a weight that depends on an average bitcount for all pictures of the corresponding given type back to the most recent scene change I picture and an average complexity for all pictures of the corresponding given type back to the most recent scene change I picture, exclusively;
    b) encoding the current picture into a compressed format using the QP determined in a) to generate an encoded current picture, wherein encoding the current picture includes calculating a distortion of the current picture from the encoded current picture; and
    c) updating the rate control data based on statistical data determined from the encoded current picture.

2. The method of claim 1, further comprising repeating a) through c) for one or more subsequent pictures of the one or more video pictures.

3. The method of claim 1, wherein a) includes taking a picture distortion into account in determining the QP.

4. The method of claim 1, wherein a) includes determining an estimated bit usage for the current picture based on an actual bit usage for one or more previous pictures and a complexity for one or more previous pictures and computing the QP based on the estimated bit usage.

5. The method of claim 4, wherein a) includes determining the estimated bit usage for the current picture based on an actual bit usage for one or more previous pictures, a complexity for one or more previous pictures, and a distortion for one or more previous pictures.

6. The method of claim 4, wherein the current picture contains a scene change and wherein a) include determining the estimated bit usage based on an average actual bit count over all pictures of the same type as the current picture back to a most recent scene change I-picture and an average complexity over all pictures of the same type as the current picture back to the most recent scene change I-picture, exclusively.

7. The method of claim 4, wherein the current picture is an I-picture and wherein a) includes determining the estimated bit usage from an actual bit usage, complexity and distortion for a most recent P-picture preceding the current picture and an actual bit usage, complexity and distortion for a most recent I-picture preceding the most recent P-picture.

8. The method of claim 4, wherein the current picture is a P-picture and wherein a) includes determining the estimated bit usage from an actual bit usage and complexity from a most recent I-picture, P-picture and B-picture.

9. The method of claim 4, wherein the current picture is a B-picture and wherein a) includes determining the estimated bit usage from an actual bit usage and complexity from a most recent I-picture, P-picture and B-picture.

10. The method of claim 4, wherein a) further comprises adjusting the estimated bit usage in a manner calculated to avoid an underflow or overflow of a buffer used to store the encoded current picture.

11. The method of claim 4, wherein determining an estimated bit usage for the current picture includes use of one or more stabilizer terms that to reduce an effect of fluctuations in an average bit usage or average complexity on the computation of the estimated bit usage.

12. The method of claim 1, wherein a) includes clipping the QP so that the value of the QP lies within a predetermined range.

13. The method of claim 1, wherein calculation of the distortion is performed in parallel on a plurality of processor units.

14. The method of claim 13 wherein calculating the distortion includes calculating a total distortion of the current picture on a section-by-section basis, wherein distortion calculations for different sections of the current picture performed in parallel using a different processor unit for each different section.

15. The method of claim 14, wherein a NAL decoding thread collects section-by-section distortions computed for each section of the current picture and calculates an overall distortion of the current picture from the section-by-section distortions.

16. The method of claim 1, wherein c) includes one or more of:
    collecting statistical data relating to the encoded current picture,
    updating statistical data in a Rate Control Data Buffer,
    checking fullness of the rate control data buffer to determine a potential for buffer overflow, or
    implementing a buffer overflow prevention mechanism.

17. The method of claim 1, further comprising, prior to a):
    setting up an initial status of a rate control data buffer that contains the rate control data.

18. The method of claim 17 wherein setting up the initial status includes computing a complexity of the current picture.

19. A computer-implemented system for rate control in computer-implemented encoding one or more video pictures, comprising:
    a processor;
    a memory coupled to the processor; and
    a set of instructions executable by the processor, the instructions including:
    a) an instruction for determining a quantization parameter (QP) to be used for encoding a current picture one of the one or more video pictures using rate control data stored in the memory, wherein a) includes taking picture type, picture complexity, and a target bitcount into account in determining the QP, wherein, when a current picture is a scene-change I picture, the target bitcount for the current picture is determined from a product of a bit budget times an average actual bitcount divided by a weighted sum of numbers of pictures for given types in a sliding window, wherein the average actual bitcount is an average bitcount for pictures of a same type as the current picture back to a most recent scene change I picture, exclusively, wherein the weighted sum of numbers of pictures includes a term for each of the given types, wherein the term for a corresponding given type includes a weight that depends on an average bitcount for all pictures of the corresponding given type back to the most recent scene change I picture and an average complexity for all pictures of the corresponding given type back to the most recent scene change I picture, exclusively;

b) an instruction for encoding the current picture into a compressed format using the QP determined in a) to generate an encoded current picture, wherein encoding the current picture includes calculating a distortion of the current picture from the encoded current picture; and c) an instruction for updating the rate control data based on statistical data determined from the encoded current picture.

20. A non-transitory computer-readable storage medium having computer program instructions embodied therein, wherein the computer program instructions are configured, when executed, to:

a) determine a quantization parameter (QP) to be used for encoding a current picture one of the one or more video pictures using rate control data, wherein a) includes taking picture type, picture complexity, and a target bitcount into account in determining the QP, wherein, when a current picture is a scene-change I picture, the target bitcount for the current picture is determined from a product of a bit budget times an average actual bitcount divided by a weighted sum of numbers of pictures for given types in a sliding window, wherein the average actual bitcount is an average bitcount for pictures of a same type as the current picture back to a most recent scene change I picture, exclusively, wherein the weighted sum of numbers of pictures includes a term for each of the given types, wherein the term for a corresponding given type includes a weight that depends on an average bitcount for all pictures of the corresponding given type back to the most recent scene change I picture and an average complexity for all pictures of the corresponding given type back to the most recent scene change I picture, exclusively;

b) encode the current picture into a compressed format using the QP determined in a) to generate an encoded current picture, wherein encoding the current picture includes calculating a distortion of the current picture from the encoded current picture; and c) update the rate control data based on statistical data determined from the encoded current picture.

* * * * *